(12) United States Patent
Saga et al.

(10) Patent No.: US 6,715,092 B1
(45) Date of Patent: Mar. 30, 2004

(54) POWER MANAGEMENT APPARATUS

(75) Inventors: Masaki Saga, Suita (JP); Hideaki Takechi, Toyonaka (JP); Koichi Matsumura, Settsu (JP); Masao Ikezaki, Neyagawa (JP); Hajime Maekawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/088,709

(22) PCT Filed: Sep. 18, 2000

(86) PCT No.: PCT/JP00/06340

§ 371 (c)(1),
(2), (4) Date: Mar. 20, 2002

(87) PCT Pub. No.: WO01/22203

PCT Pub. Date: Mar. 29, 2001

(30) Foreign Application Priority Data

Sep. 20, 1999 (JP) ............................................. 11-266285

(51) Int. Cl.⁷ .............................. G06F 1/26; G06F 1/28; G06F 1/30
(52) U.S. Cl. ........................ 713/324; 713/310; 713/320; 713/323
(58) Field of Search ................................ 700/11–17, 19, 700/21, 22, 28, 29, 49, 65, 79, 82, 83, 86, 89, 275, 276, 286, 297, 298; 713/300–340

(56) References Cited

U.S. PATENT DOCUMENTS

| 5,765,001 | A | * | 6/1998 | Clark et al. | ............ | 395/750.08 |
| 6,105,142 | A | * | 8/2000 | Goff et al. | ............ | 713/324 |
| 6,405,320 | B1 | * | 6/2002 | Lee et al. | ............ | 713/300 |
| 6,446,213 | B1 | * | 9/2002 | Yamaki | ............ | 713/300 |

FOREIGN PATENT DOCUMENTS

| JP | 04-268852 | 9/1992 |
| JP | 63-204861 | 8/1998 |

OTHER PUBLICATIONS

Japanese search report for PCT/JP00/06340 dated Dec. 26, 2000.
English translation of Form PCT/ISA/210.
Winn L. Rosch, "Hardware Bible" Jul. 1997, Premier Edition, Sam's Publishing, Chapter 24, pp. 29–53.*

* cited by examiner

Primary Examiner—Leo Picard
Assistant Examiner—Sean Shechtman
(74) Attorney, Agent, or Firm—RatnerPrestia

(57) ABSTRACT

In a host apparatus having a service function and a host function peculiar to the apparatus together, since means such as an interface section for controlling electric power supplied to a service section and a host section that are both the functions are common to the service section and the host section, it is difficult to turn off the power state of the host function, thus the user substantially cannot control the service function.

The host apparatus has an interface section for receiving an input of at least an on command or an off command from the outside, host means connected on a network, a service section for performing a predetermined operation, a power source for supplying electricity at least to the host means and the service section, and power source monitoring section of controlling a state of a power supplies to the host means and the service section.

11 Claims, 9 Drawing Sheets

PRIOR ART

POWER MANAGEMENT APPARATUS

THIS APPLICATION IS A U.S. NATIONAL PHASE APPLICATION OF PCT INTERNATIONAL APPLICATION PCT/JP00/06340.

TECHNICAL FIELD

The present invention relates to a management apparatus and method or the like for controlling power such that the management apparatus can make good use of operations for controlling and monitoring apparatuses connected on a network.

BACKGROUND ART

In recent years, a system has been proposed which connects not only computers and their peripheral equipment but also a plurality of apparatuses, for example, home electric appliances, audio equipment, VTRs (i.e., video tape recorder) or the like as appliances for home use to the network to control and manage them. Such a system is composed of a host apparatus, which has a host function and controls other apparatuses connected to the network, and a target apparatus that becomes a target of control of the host apparatus.

FIG. 5 illustrates a configuration of a host apparatus according to a conventional art. In the figure, reference numeral 501 denotes a host apparatus, 502 denotes a network for connecting to a not-shown external target apparatus, 511 denotes an interface section, 512 denotes a service section for performing operations peculiar to the host apparatus 501, 513 denotes a timer section for performing reserving operations, 521 denotes an interface section, 522 denotes a host section having communication, control and other network functions, 524 denotes a storage section for recording a command and other information inputted from a target apparatus via the network 502, 525 denotes a power source monitoring section, 526 denotes a power source and 527 denotes a communication section. Here, the power source monitoring section 525 and the power source 526 are means that are commonly used by both the service section 512 and the host section 522 to receive supply of electric power.

In the host apparatus 501 according to the conventional art which has the above-mentioned configuration, the service section 512 performs service operations peculiar to the apparatus, whereas the host section 522 performs control or monitoring of a target apparatus connected to the network 502 as a host of the network 502. In addition, the host section 522 is also capable of operating based on a reserved time set in the timer section 513.

Here, the host apparatus 501 may have a configuration in which the host section 522 is positioned as a central function of the apparatus, and the service section 512 is additionally positioned as a section not specifically necessary. That is, the service function 512 and the host function 522 are equivalently positioned viewed from the power source 526 and the power source monitoring section 525 and do not have a clear distinction as the target monitored by the power source monitoring section 525.

However, the conventional host apparatus 501 having such a configuration may cause inconvenience for a user described below.

FIG. 6 illustrates a power control state transition for explaining operations of the host apparatus 501. As shown in FIG. 6, if a user sends an instruction 615 for making the power state of the apparatus 501 off while the host apparatus 501 is operating (in mode 601), since the power source monitoring section 525 and the power source 526 are commonly used by the service section 512 and the host section 522, the service section 512 and the host section 522 are completely turned off (mode 604) by a single instruction to turn off the power. FIG. 6 also illustrates an instruction 617 from mode 604 to mode 601.

Here, even if the user sends the instruction 615 intending to stop only the service section 512, since the host section 522 simultaneously stops at that point, if the host section 522 controls a target apparatus connected to the network 502 at the time when the instruction 615 is sent, it is likely that the control of the target apparatus is stopped by the stop of the host section 522, which affects the other target apparatuses connected to the network 502.

Therefore, in a system in which a network is established, since the power source state of the host apparatus 501 having the host function such as the host section 522 together with the service section 512 cannot be turned into the off state 604 and it is not a desirable operation either, the host apparatus having the service section 512 has a problem in that operations of the service section cannot be performed as instructed by the user. A similar problem also occurs in the case in which the power source section 526 is given a standby function as in a control by, for example, a remote controller.

In order to avoid such a problem, a control of the power source state has to be controlled by configuring a host apparatus to give interface sections 711 and 721, power source monitoring sections 715 and 725, power supplies 716 and 726 or the like independently to a service section 712 and a host section 722, respectively, as in a host apparatus 701 shown in FIG. 7 and receiving inputs from the interface sections independently in the service section and the host section. Host apparatus 701 in FIG. 7 also includes timer section 723, storage section 724, and communication section 727. Here, FIG. 8 illustrates a power control state transition in the case in which the host apparatus 701 is used, and as shown in the figure, an operation mode 801 and a stop mode 802 of the host section 722 and an operation mode 803 and a stop mode 804 of the service section 712 are independent each other, thus the user needs to perform a control independently with respect to the host section 722 and the service section 712 by using the interface section 711 and 721.

As described above, according to the above-mentioned conventional art, in the host apparatus 501 having a service function and a host function peculiar to the apparatus together, since means such as an interface section for controlling electric power supplied to a service section and a host section that are both the functions are common to the service section and the host section, it is undesirable to turn off the power state of an apparatus having the host function connected to a network, thus the user substantially cannot control the service function.

In addition, a host apparatus 701 having a configuration in which, in order to give a composited function of a service function and a host function, a service section and a host section that are both the functions are independent as in the host apparatus 701, and to give a plurality of means of controlling supply states of electric power to each function for a user, whereby the service function can be controlled without stopping the operations of the host function, but an entire configuration and operations of the host apparatus become complicated and operations with large power consumption and low efficiency are performed.

DISCLOSURE OF THE INVENTION

The present invention has been devised in view of the above-mentioned subject and is to provide a management apparatus or the like having a host function for performing operations with respect to a network and a service function for performing other operations, wherein, while means of switching a state of a power supply which a user can operate directly is one as in the past, the management apparatus can perform a control of a state of power supply by the host function and the service function individually, make maximum use of operations of control and monitoring with respect to the other apparatuses connected to the network, and suppress useless power consumption.

To achieve the above object, one aspect of the present invention is a management apparatus, comprising:

an interface section for receiving an input of at least an on command or an off command from the outside;

host means connected on a network;

a service section for performing a predetermined operation;

a power source for supplying electricity at least to said host means and said service section; and power supply controlling means of controlling a state of a power supplies to said host means and said service section, characterized in that if said interface section receives an input of an off command when the power supplies to said host means and said service means are in the on state, said interface section causes said power supply controlling means to turn the power supply to said service section into the off state and checks an operating state of said host means, and if said host means operates, keeps the power supply to said host means in the on state by said power supply controlling means.

Further, the 2nd invention of the present invention (corresponding to claim 2) is the management apparatus according to the above-described invention further comprising reserving operation setting means of reserving an operation of said host means, characterized in that if said interface section receives an input of an off command, said interface section checks an operating state of said host means and a reservation state of said reserving operation setting means, if said host means does not operate and a reservation is made in said reserving operation setting means, said interface section causes said power supply controlling means to turn the power supply to said host means into a standby state, and if said host means does not operate and a reservation is not made in said reserving operation setting means, said interface section causes said power supply controlling means to turn the power supply to said host means into the off state.

Further, the 3rd invention of the present invention (corresponding to claim 3) is the management apparatus according to the above-described invention, characterized in that if said interface section confirms that the operation of said host means ends, said interface section causes said power supply controlling means to turn the power supply to said host means into the off state.

Further, the 4th invention of the present invention (corresponding to claim 4) is the management apparatus according to the above-described invention, characterized in that said interface section is further capable of receiving an input of a standby command, if said interface section receives an input of the standby command when the power supplies to the host means and the service section is in the on state, said interface section causes said power supply controlling means to turn the power supply of said service section into a standby state and checks an operating state of said host means, if said host means operates, said interface section causes said power supply controlling means to turn the power supply to said host means into the on state, and if said host means does not operate, said interface section causes said power supply controlling means to turn the power supplies to said service section and said host means into a standby state.

Further, the 5th invention of the present invention (corresponding to claim 5) is the management apparatus according to the above-described invention, characterized in that if said interface section confirms that an operation of said host means ends, said interface section causes said power supply controlling means to turn the power supply of said host means into the standby state.

Further, the 6th invention of the present invention (corresponding claim 6) is the management apparatus according to the above-described invention, further comprising reserving operation setting means of reserving an operation of said host means, characterized in that if a reserved time set in said reserving operation setting means comes or if said interface section receives a command to release the standby command, said interface section causes said power supply controlling means to turn the power supply to said host means into the on state.

Further, the 7th invention of the present invention (corresponding to claim 7) is the management apparatus according to the above-described invention, characterized in that if said interface section receives an input of an on command, said interface section causes said power controlling means to turn power supply states to said service section and said host means into the on state.

Further, the 8th invention of the present invention (corresponding to claim 8) is the management apparatus according to the above-described invention, characterized in that if said interface section receives an input of a standby releasing command, said interface section causes said power control means to turn power supply states to said service section and said host means into the on state.

Further, the 9th invention of the present invention (corresponding to claim 9) is a medium carrying a program and/or data for causing a computer to execute all or a part of functions of all or a part of means of the present invention described in any one of the 1st to 8th inventions, characterized in that the medium is processable by a computer.

Further, the 10th invention of the present invention (corresponding to claim 10) is an information aggregate, characterized by being a program and/or data for causing a computer to execute all or a part of functions of all or a part of means of the present invention described in any one of the 1st to 8th inventions.

Since the management apparatus is configured as described above, it can make maximum use of operations of control and monitoring with respect to the other apparatuses connected to the network and suppress useless power consumption.

For example, in a power saving switching method of the present invention, an apparatus for switching a power source state which a user can operate directly is one as in the past and has a configuration in which states more than two of on and off states are given in order to manage power source to a host function and a service function peculiar to the apparatus individually.

Moreover, by using the above-mentioned present invention, a power saving switching method is realized which is characterized by including the steps of:
if the power supply to the above-mentioned service section and the above-mentioned host means are in a normal mode that is the on state and the above-mentioned interface section has received an instruction to turn the management apparatus into the off state,
the above-mentioned interface section sending a command to stop operations to the above-mentioned service section and also sending a command to check operating states of the above-mentioned host means to the above-mentioned host means; and
if the above-mentioned host means performs operations with respect to the above-mentioned network,
the above-mentioned power supply controlling means transitioning to a first wait mode (host mode) for turning the power supply to the above-mentioned service section into the off state.

In addition, by using the above-mentioned present invention, a power saving switching method is realized which is characterized by including the steps of:
if the above-mentioned host means does not perform operations with respect to the above-mentioned network and an reservation is not made in the above-mentioned reserving operation setting means in the above-mentioned host mode of the above-mentioned power saving switching method,
the above-mentioned power supply controlling means transitioning to a second wait mode (downmode) for turning both the power supplies to the above-mentioned service section and the above-mentioned host means into the off state.

In addition, by using the above-mentioned present invention, a power saving switching method is realized which is characterized by including the steps of:
when the above-mentioned interface section receives an input of an instruction to turn the power state of the above-mentioned management apparatus into the on state in the above-mentioned host mode of the above-mentioned power saving switching method,
the above-mentioned power supply controlling means turning the power supply state of the above-mentioned service section into on; and
the above-mentioned interface section sending a command to start operations to the above-mentioned service section and the above-mentioned service section transitioning to the above-mentioned normal mode for operating with an already operating host means.

Moreover, by using the above-mentioned present invention, a power saving switching method is realized which is characterized by including the steps of:
if the power supplies to the above-mentioned service section and the above-mentioned host means are in the normal mode that is the on state and the above-mentioned interface section has received an instruction to turn the management apparatus into the off state,
the above-mentioned interface section sending a command to stop operations to the above-mentioned service section and also sending a command to check operating states of the above-mentioned host means to the above-mentioned host means; and
if the above-mentioned host means does not perform operations with respect to the above-mentioned network and a reservation is made in the above-mentioned reserving operation setting means,
the power supply control means transitioning to a third wait mode (host standby mode) for turning the power supply to the service section into the off state and also turning the power supply to the host means into the standby state.

In addition, by using the above-mentioned present invention, a power saving switching method is realized which is characterized by including the steps of:
if the above-mentioned host means reached a time when operations with respect to the above-mentioned network is started based on a reservation made in the above-mentioned reserving operation setting means in the above-mentioned host standby mode of the above-mentioned power saving switching method,
the above-mentioned power supply controlling means transitioning to the host mode for turning the power supply to the host means into the on state and keeping the power state of the above-mentioned service section in the off state.

In addition, by using the above-mentioned present invention, a power saving switching method is realized which is characterized by including the steps of:
if the above-mentioned interface section receives an instruction to turn the management apparatus into the on state in the above-mentioned host standby mode in the above-mentioned power saving switching method, the above-mentioned power supply controlling means transitioning to the above-mentioned normal mode for turning both the power supplies to the above-mentioned host means and the above-mentioned service section into the on state and the above-mentioned service section performing operations according to a command from the above-mentioned interface section.

Moreover, by using the above-mentioned present invention, a power saving switching method is realized which is characterized by including the steps of:
if the power supplies to the above-mentioned service section and the above-mentioned host means are in the normal mode that is the on state and the above-mentioned interface section has received an instruction to turn the above-mentioned management apparatus into the off state,
the above-mentioned interface section sending a command for stopping operations of the above-mentioned service section and checking operating states of the above-mentioned host means to the above-mentioned host means; and
if the host means does not perform operations with respect to the above-mentioned network and the above-mentioned network information holding means does not hold network reservation information, the above-mentioned power supply controlling means transitioning to the down mode for turning both the power supplies to the above-mentioned host means and the above-mentioned service section into the off state.

In addition, by using the above-mentioned present invention, a power saving switching method is realized which is characterized by including the steps of:
if the above-mentioned interface section receives an instruction to turn the management apparatus into the on state in the above-mentioned down mode of the above-mentioned power saving switching method,
the above-mentioned power supply controlling means turning the power supply to the above-mentioned service section into the on state, and the above-mentioned interface section transitioning to the above-mentioned normal mode for operating the above-mentioned service section and causing the above-mentioned host means to perform operations with respect to the above-mentioned network.

Moreover by using the above-mentioned present invention, a power saving switching method is realized which is characterized by including the steps of:
if the power supply to the above-mentioned service section and the above-mentioned host means is in the normal mode that is the on state and the above-mentioned interface section receives an instruction to turn the above-mentioned management apparatus into the standby state,
the above-mentioned interface section sending a command to stop operations to the above-mentioned service section and also sending a command to check operating states of the above-mentioned host means to the above-mentioned host means; and
if the above-mentioned host means confirms that operations with respect to the above-mentioned network are performed, the above-mentioned power supply controlling means transitioning to a fourth wait mode (service standby mode) for turning the power supply to the above-mentioned host means into the on state and turning the power supply to the above-mentioned service section into the standby mode.

In addition, by using the above-mentioned present invention, a power saving switching method is realized which is characterized by including the steps of:
when the above-mentioned interface section receives an input of an instruction to turn the above-mentioned management apparatus into the off state in the above-mentioned service standby mode of the above-mentioned power saving switching method,
the above-mentioned interface section sending a command to stop operations to the above-mentioned service section and also sending a command to check a power supply state to the above-mentioned host means; and
if the above-mentioned host means performs operations with respect to the above-mentioned network, the above-mentioned power supply controlling means transitioning to the host mode for turning only a power supply of the above-mentioned service section into the off state.

In addition, by using the above-mentioned present invention, a power saving switching method is realized which is characterized by including the steps of:
if the above-mentioned interface section has received an input of an instruction to turn the above-mentioned management apparatus into a standby releasing mode in the above-mentioned service standby mode of the above-mentioned power saving switching method,
the above-mentioned interface section sending a command to start operations to the above-mentioned service section; and
the power supply controlling means transitioning to the above-mentioned normal mode for turning both the power supplies to the above-mentioned host means and the above-mentioned service section into the on state.

Moreover, by using the above-mentioned present invention, a power saving switching method is realized which is characterized by including the steps of:
if the power supplies to the above-mentioned service section and the above-mentioned host means is in the normal mode that is the on state and the above-mentioned interface section has received an instruction to turn the above-mentioned management apparatus into the standby state,
the above-mentioned interface section sending a command to stop operations of the above-mentioned service section to the above-mentioned service section and also sending a command to check operating states to the above-mentioned host means; and
if the above-mentioned host means does not perform operations with respect to the above-mentioned network and a reservation is made in the above-mentioned reserving operation setting means, the above-mentioned power supply controlling means transitioning to a double standby mode for turning both the power supplies to the above-mentioned host means and the above-mentioned service section.

In addition, by using the above-mentioned present invention, a power saving switching method is realized which is characterized by including the steps of:
when the power supply controlling means has turned the power supply to the above-mentioned host means into the on state based on the reservation made in the above-mentioned reserving operation setting means in the above-mentioned double standby mode of the above-mentioned power saving switching method,
the above-mentioned power supply controlling means turning the power supply to the above-mentioned host means into the on state and the above-mentioned host means transitioning to a service standby mode for starting operations with respect to the above-mentioned network.

In addition, by using the above-mentioned present invention, a power saving switching method is realized which is characterized by including the steps of:
if the above-mentioned interface section has received an instruction to turn the above-mentioned management apparatus into the standby releasing state, the above-mentioned interface section sending a command to start operations to the above-mentioned service section and turning both the power supplies to the above-mentioned host means and the above-mentioned service section into the on state to transition to the above-mentioned normal mode.

In addition, by using the above-mentioned present invention, a power saving switching method is realized which is characterized by including the steps of:

if the above-mentioned interface section has received an instruction to turn the above-mentioned management apparatus into the off state in the above-mentioned double standby mode of the above-mentioned power saving switching method, the above-mentioned interface section sending a command to stop operations to the above-mentioned service section and the above-mentioned power supply controlling means transitioning to the host standby mode for turning the power supply to the above-mentioned service section into the off state.

Figure 1:
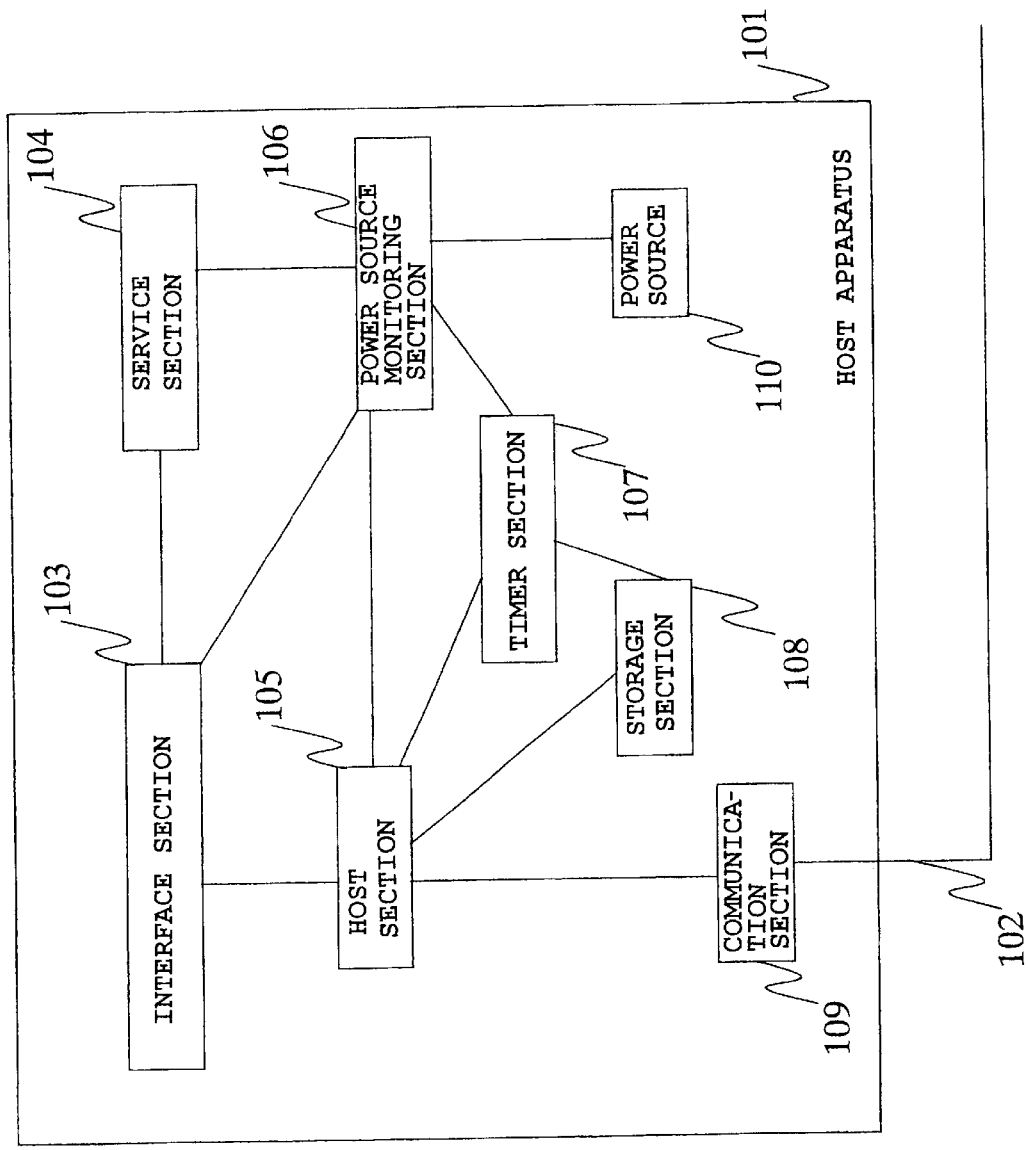
FIG. 1 is a diagram showing a configuration of a host apparatus according to a first embodiment of the present invention.

DESCRIPTION OF SYMBOLS 101, 301 Host Apparatus
102 Network
103, 303 Interface section
104 Service section
105 Host section
106 Power source monitoring section
107 Timer section
108 Storage section
109 Communication section
110 Power source
201 Normal mode
202 Host mode
203 Host standby mode
204 Down mode
211, 212, 213, 214, 215,216, 217, 218,411, 412, 413, 414, 415, 416, 417, 418, 419 State transition
303a Remote controller
401 Service standby mode
402 Double standby mode

BEST MODE FOR CARRYING OUT THE INVENTION

Embodiments of the present invention will be hereinafter described.

First Embodiment

FIG. 1 is a diagram showing a configuration of a host apparatus according to a first embodiment of the present invention. In the figure, reference numeral 101 denotes a host apparatus, 102 denotes a network for connecting to a not-shown external target apparatus, 103 denotes an interface section, 104 denotes a service section for performing operations peculiar to the host apparatus, 105 denotes a host section having communication, control and other network functions, 106 denotes a power source monitoring section for monitoring and controlling power source states of the service section 104 and the host section 105, 107 denotes a timer section connected to the host section 105, the power source monitoring section 106 and the storage section 108, 108 denotes a storage section for recording a command and other information inputted from a target apparatus via a network 102, 109 denotes a communication section for performing communication with the not-shown target apparatus connected to the network 102, and 110 denotes a power source. However, concerning the above-mentioned each section, the interface section 103, the timer section 107, the storage section 108 and the communication section 109 can receive supply of electricity by the power source 110 or other arbitrary methods. A user can only change a power source state via the interface section 303, and only one interface section 303 is provided in one host apparatus 101.

Further, in the above-mentioned configuration, the host apparatus 101 is an example of a management apparatus of the present invention, the host section 105 and the communication section 109 are examples of host means of the present invention, the power source monitoring section 106 is an example of power supply control means of the present invention, and the timer section 107 and the storage section 108 are examples of reserving operation setting means of the present invention.

Figure 2:
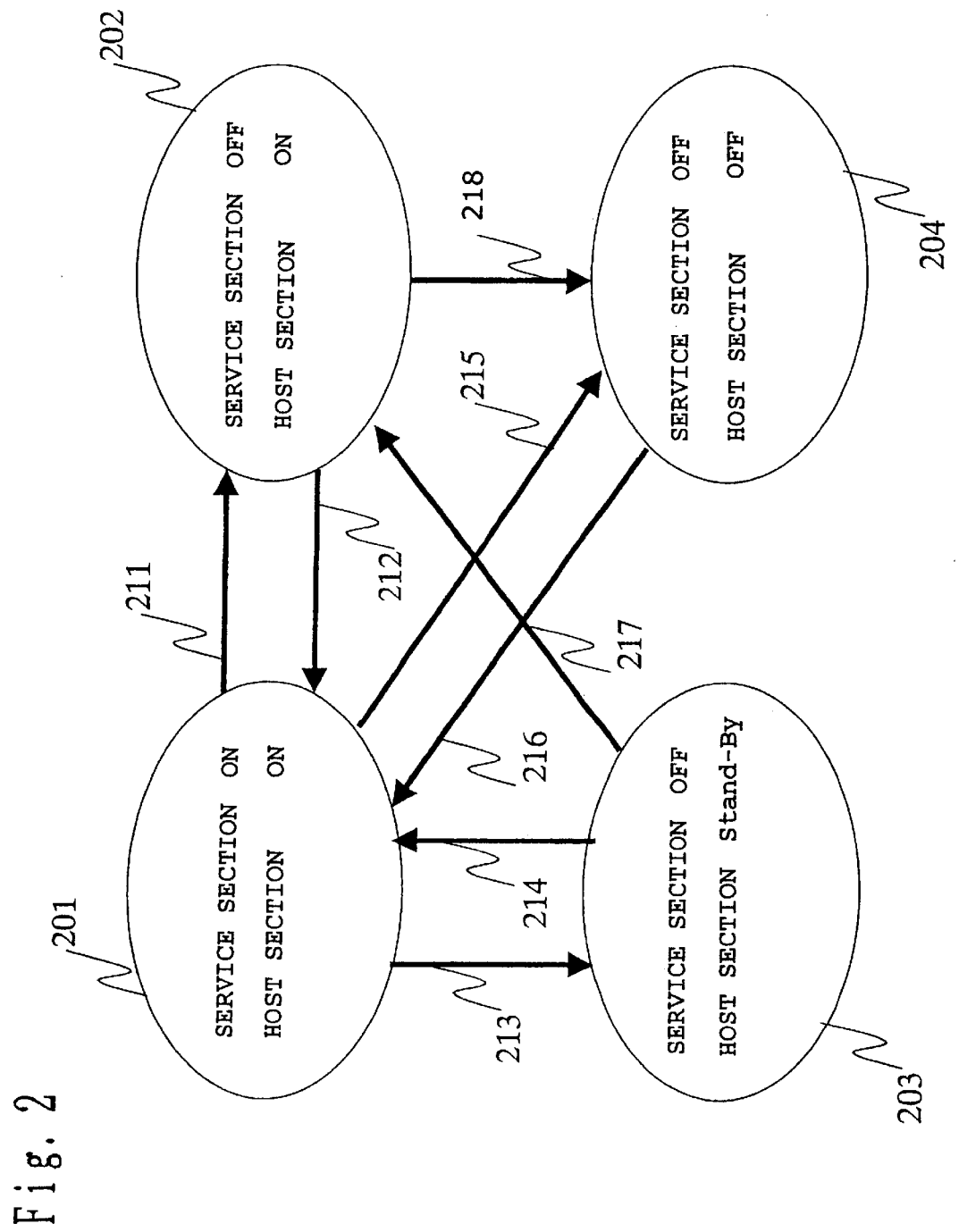
FIG. 2 is a diagram of a power control state transition of the host apparatus according to the first embodiment of the present invention.

Next, FIG. 2 is a diagram of a power control state transition in operations of this first embodiment. Using these two figures, operations of the host apparatus according to this embodiment will be described with reference to each mode and conditions of a state transition between each mode and a power saving switching method using the present invention will also be described.

First, in the normal mode 201 shown in FIG. 2, the service section 104 and the host section 105 receive a power supply from the power source 110 via the power source monitoring section 106, both power sources of both the sections are in the on state and each of the sections performs predetermined operations in the host apparatus 101.

Next, when a user issues a command to turn the power state of the host apparatus 101 into the off state through the interface section 103, the interface section 103 sends a command to stop services to the service section 104, and the service section 104 having received the command stops the services. Moreover, the service section 104 sends a command to stop services to the power source monitoring section 106, and the power source monitoring section 106 having received the command stops the power supply to the service section 104 and turns the power source to the service section 104 into the off state.

On the other hand, the interface section 103 sends a command to stop host operation receipt to the host section 105, and the host section 105 having received the command does not receive an operation reservation anew from a target apparatus connected to the network 102.

Moreover, the interface section 103 sends a command to check a working state to the host section 105, and the host section 105 having received the command performs a transition of a mode according to each working state to be described below.

A state transition 211 is a transition in the case in which the host section 105 performs communication with the target apparatus connected to the network 102 at the point when the host section 105 receives the check command from the interface section 103, and applies a control or monitoring operation to the target apparatus. At this point, the host section 105 continues a control or monitoring operation as it was before. Therefore, the power source monitoring section 106 turns the power supply to the service section 104 into the off state, whereas the power source monitoring section 106 holds the power supply to the host section in the on state. A state of each power supply of the service section 104 and the host section 105 at this point is called a host mode 202.

A state transition 213 is a transition in the case in which the host section 105 neither performs communication with the target apparatus connected to the network 102 nor applies a control or monitoring operation to the target apparatus at the point when the host section 105 receives a check command from the interface section 103, but a schedule of control or monitoring operations in the future have already been stored in the storage section 108. At this point, the host section 105 stops the control or monitoring operation of the target apparatus until a time set in reservation information stored in the storage section 108 and transmits the control of the power supply to the power source monitoring section 106. The power source monitoring section 106 having received an instruction from the host section 105 immediately reduces the power supply to the host section 105 to power sufficient for the host section 105 to start operations. A state of power supply of the host section 105 at this point is called a standby state, and a state of each power supply of the service section 104 and the host section 105 is collectively called a host standby mode 202.

A state transition 215 is a transition in the case in which the host section 105 does not perform communication, control and monitoring operations with the target apparatus connected to the network 102 at the point when the host section 105 receives a check command from the interface section 103 and does not store reservation information in the storage section 108. At this point, the host section 105 transmits the control of the power supply to the power source monitoring section 106. The power monitoring section 106 having received it stops the power supply to the host section 105 and turns the power supply to the host section 105 into the off state. The power supplies to both the service section 104 and the host section 105 are in the off state at this stage, and these are collectively called a down mode 204.

Next, control in the host mode 202 will be described.

As described above, the host mode 202 is a mode in which at least the host section 105 and the power source monitoring section 106 receive power supplies from the power source 110. The host section 105 performs a transition of a mode according to each working state to be described below.

A state transition 219 is a transition in the case in which the host section 105 finishes its operation and does not perform communication, control and monitoring operations with the target apparatus connected to the network 102 at the point when the host section 105 receives a check command from the interface section 103 and does not store reservation information in the storage section 108 and it is substantially the same as the state transition 215. At this point, the host section 105 transmits the control of the power supply to the power source monitoring section 106. The power source monitoring section 106 having received it stops the power supply to the host section 105, turns the power supply to the host section 105 into the off state and transitions to the down mode 204.

A state transition 212 is a transition at the time when a user issues a command to turn the power supply to the host apparatus 101 into the on state through the interface section 103. At this point, the interface section 103 sends a command to start the power supply to the service section 104 to the power source monitoring section 106, and the power source monitoring section 106 having received this command starts the power supply to the service section 104 and turns the power supply to the service section 104 into the on state. Moreover, the interface section 103 sends a command to start service operations to the service section 104, and the service section 104 having received this command starts a predetermined service operation.

On the other hand, since the host section 105 has been operating hitherto and the power supply is in the on state, the power supply has returned to a mode in which both the power supplies to the service section 104 and the host section 105 are in the on state at this stage and perform predetermined operations, that is, the normal mode 201.

Next, controls in the host standby mode 203 will be described.

As described above, the host standby mode 203 is a mode in the standby state in which at least the power source monitoring section 106 receives the power supply from the power source 110, and the host section 105 receives the power supply with the power reduced to a sufficient level to start operations immediately. At this point, the host section 105 performs a transition of a mode according to each working state to be described below.

A state transition 217 is a transition of the following working state. That is, when the time set in the reservation information stored in the storage section 108 has come, the timer section 107 transmits a command to start a complete power supply to the host section 105. The power source monitoring section 106 resumes the complete power supply to the host section 105 and turns the power supply to the host section 105 into the on state.

Moreover, the timer section 107 sends a command to resume the control or monitoring operation to the host section 105, and the host section 105 having received this command executes the control or monitoring operation of contents set in the reservation information stored in the storage section 108.

At this stage, the power supply to the service section 104 remains in the off state and the power supply to the host section 105 is in the on state, that is, the power supply has transitioned to the host mode 202.

A state transition 214 is a transition at the time when a user issues a command to turn the host apparatus 101 into the on state through the interface section 103. At this point, the interface section 103 transmits a command to start the power supply to the service section 104 to the power source monitoring section 106. The power source monitoring section 106 having received this command starts the power supply to the service section 104 and turns the power supply to the service section 104 into the on state.

Moreover, the interface section 103 sends a command to start service operations to the service section 104, and the service section 104 having received this command starts a predetermined service operation.

On the other hand, the interface section 103 sends a command to start host operation receipt to the host section 105, and the host section 105 having received it starts receipts of operation reservations from the target apparatus connected to the network 102.

At a stage when the above-mentioned operations have been performed, both the power supplies to the service section 104 and the host section 105 are in the on state, that is, have returned to the normal mode 201.

Finally, controls in the down mode 204 will be described.

As described above, the down mode 202 is a mode in which at least both the service section 104 and the host section 105 do not receive a power supply from the power source 110 through the power source monitoring section 106, that is, the power source is in the off state. A transition of a mode in this case is performed as follows.

A state transition 216 is a transition when a user issues a command to turn the host apparatus 101 into the on state through the interface section 103. At this point, the interface section 103 sends a command to start a power supply to the service section 104 to the power source monitoring section 106, and the power source monitoring section 106 having received this command starts the power supply to the service section 104 and turns the power supply to the service section 104 into the on state. Moreover, the interface section 103 sends a command to start service operations to the service section 104, and the service section 104 having received this command starts a predetermined service operation.

On the other hand, the interface section 103 sends a command to start host operation receipt to the host section 105, and the host section 105 having received this command starts receipt of operation reservations from the target apparatus connected to the network 102.

At a stage when the above operations have been performed, both the power supplies to the service section 104 and the host section 105 are in the on state, that is, returned to the normal mode 201.

In this way, according to this embodiment, by controls of an interface section and a power source monitoring section, states of power supplies to a host section and a service section can be independently controlled, respectively, according to an operating state of the host section in response to a single input to the interface section by a user.

In addition, the host section can be turned into a standby state according to a reservation of a storage section. Thus, power consumption can be reduced in operating the host apparatus.

Second Embodiment

Figure 3:
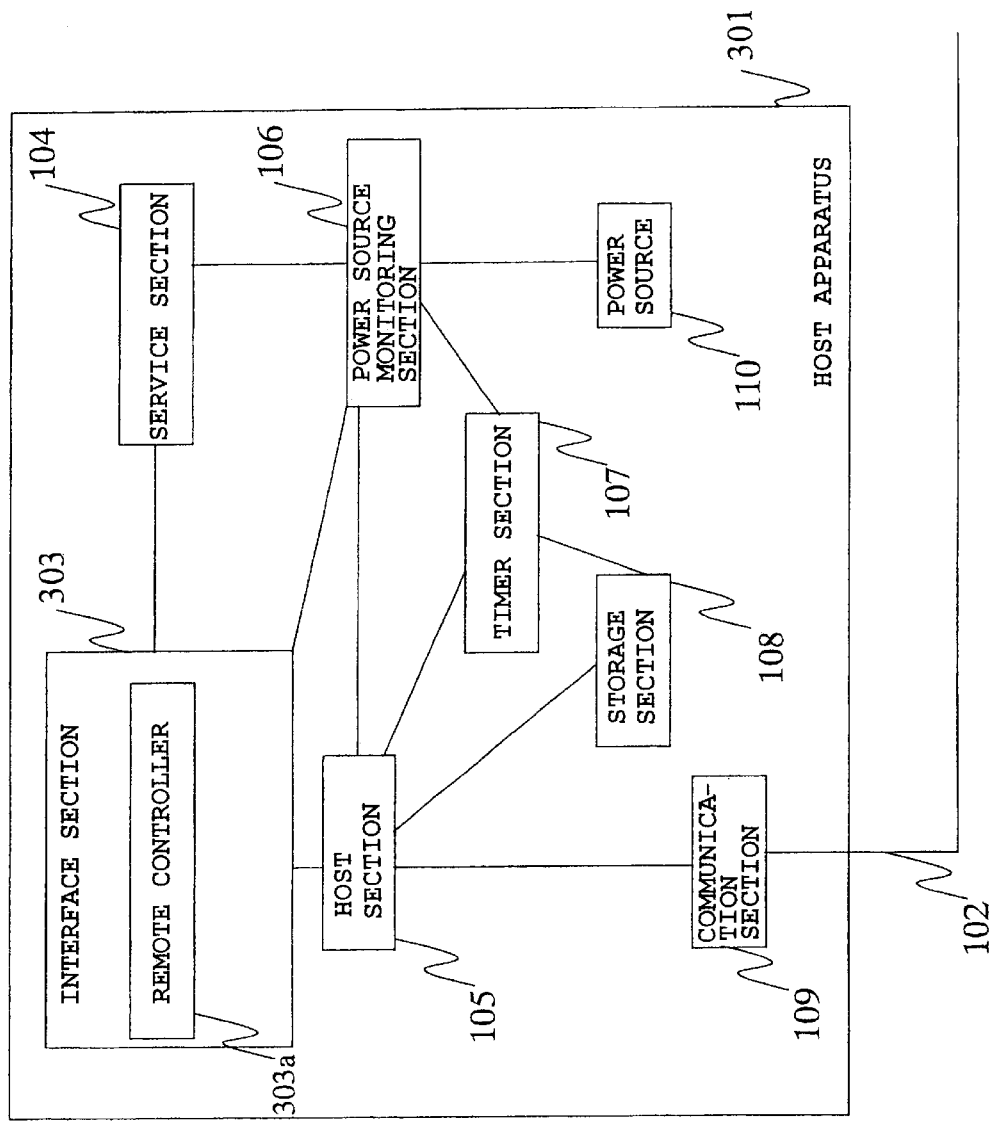
FIG. 3 is a diagram showing a configuration of a host apparatus according to a second embodiment of the present invention.

FIG. 3 is a diagram showing a configuration of a host apparatus according to a second embodiment of the present invention. In the figure, reference numerals identical with those in FIG. 1 denotes identical or equivalent parts, and reference numeral 301 denotes a host apparatus, 303 denotes an interface section, and 303a denotes a remote controller in the interface section 303.

Concerning the above-mentioned each section, the interface section 303, the timer section 107, the storage section 108 and the communication section 109 can receive supply of electricity by the power source 110 or other arbitrary methods. A user can only change a power source state via the interface section 303, and the interface section 303 has a remote controller 303a for receiving a command of a standby state. However, a user cannot control the host apparatus 301 via the remote controller 303a in the down mode 204 in which both the power supplies to the service section 104 and the host section 105 are in the off state.

Figure 4:
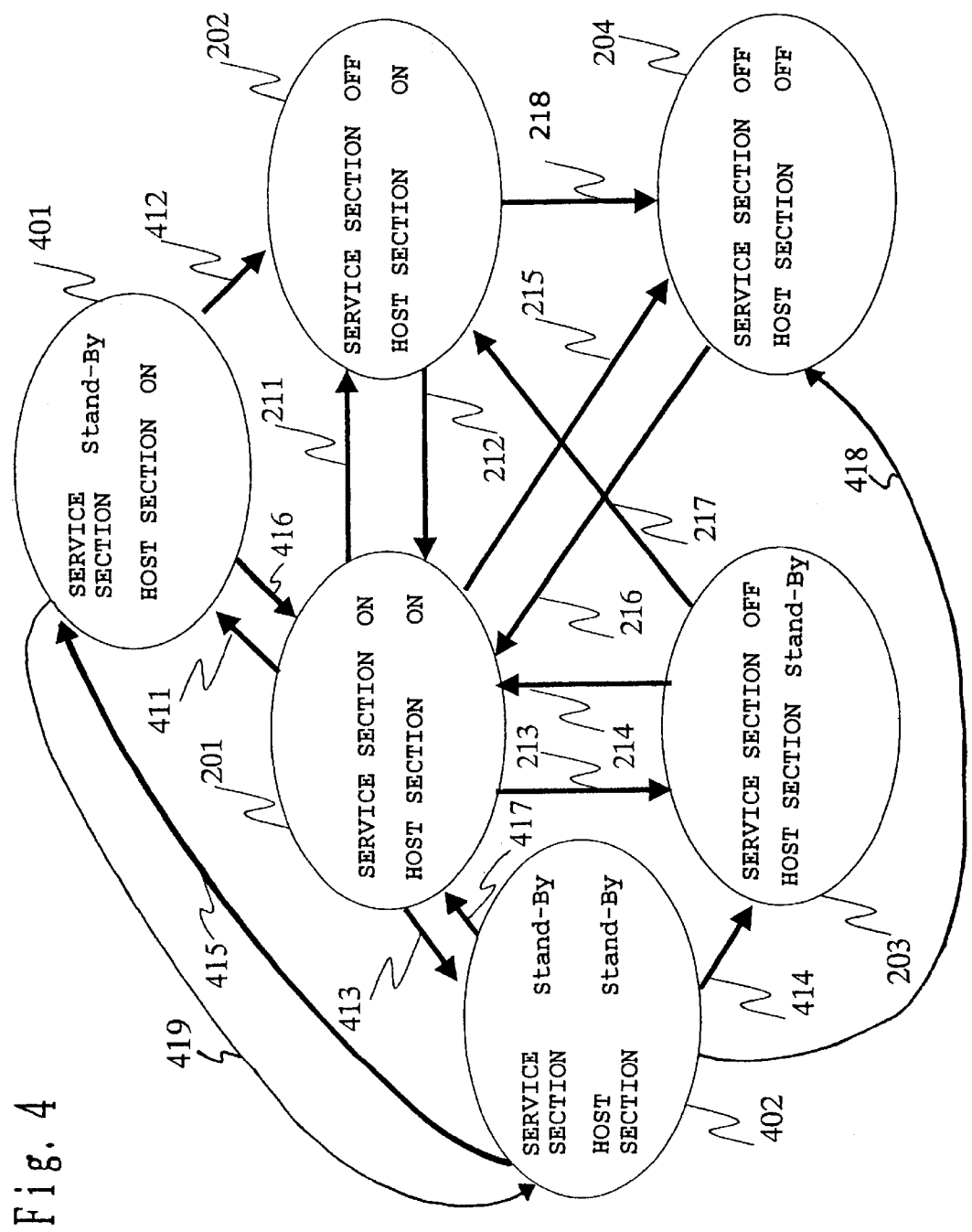
FIG. 4 is a diagram of a power control state transition of the host apparatus according to the second embodiment of the present invention.
Figure 5:
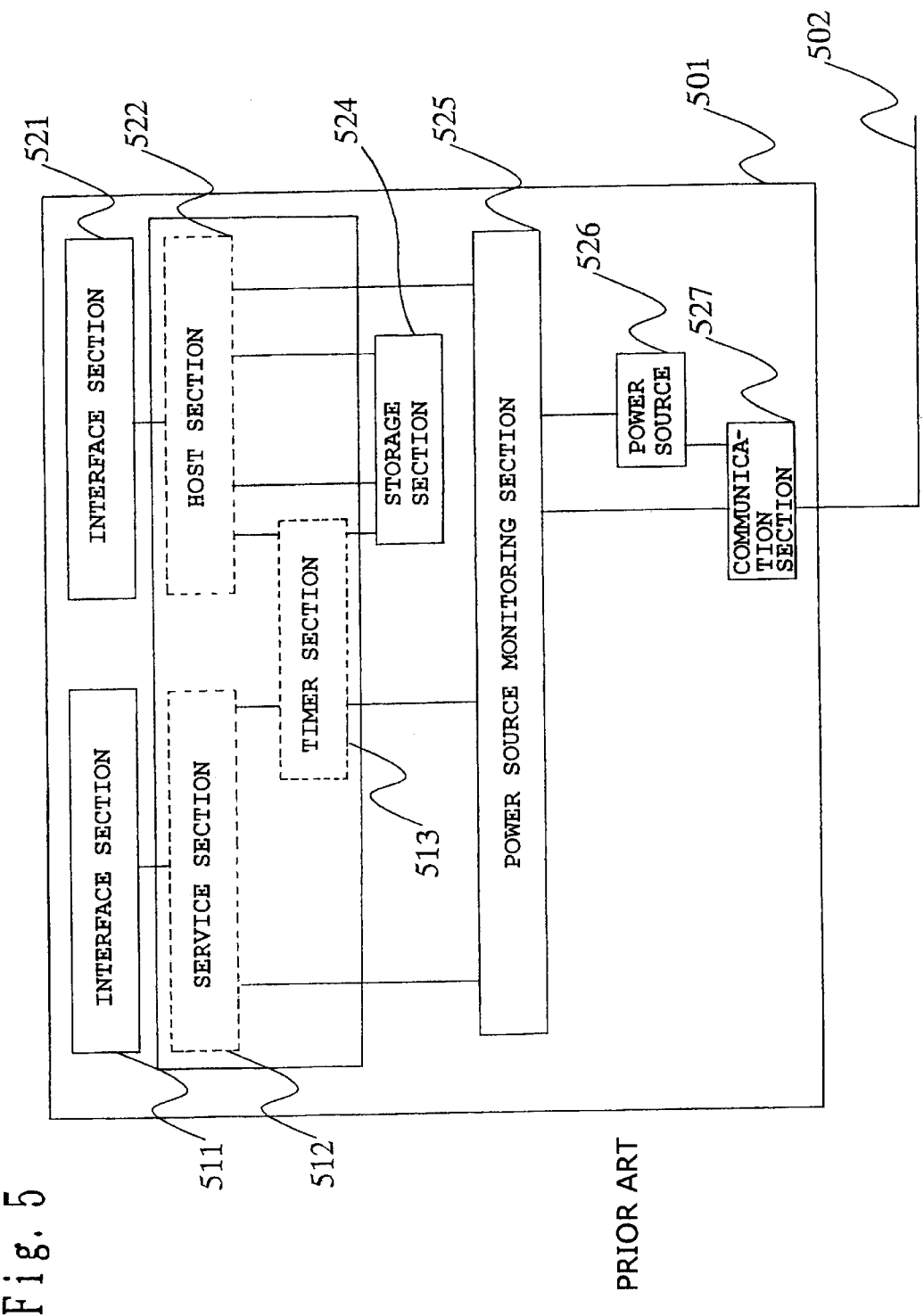
FIG. 5 is a diagram showing a configuration of a host apparatus according to a conventional art.
Figure 6:
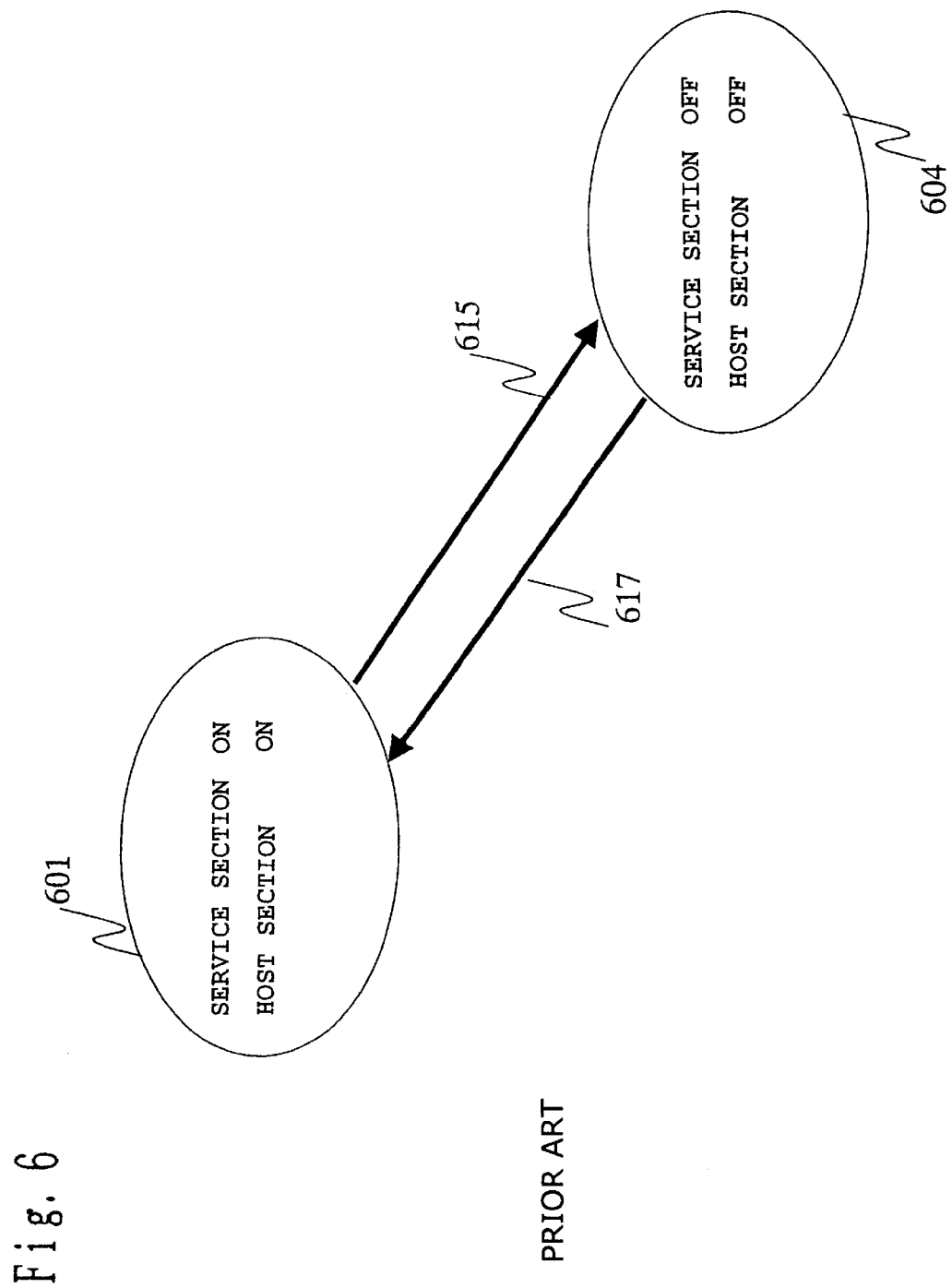
FIG. 6 is a diagram of a power control state transition of the host apparatus according to the conventional art.
Figure 7:
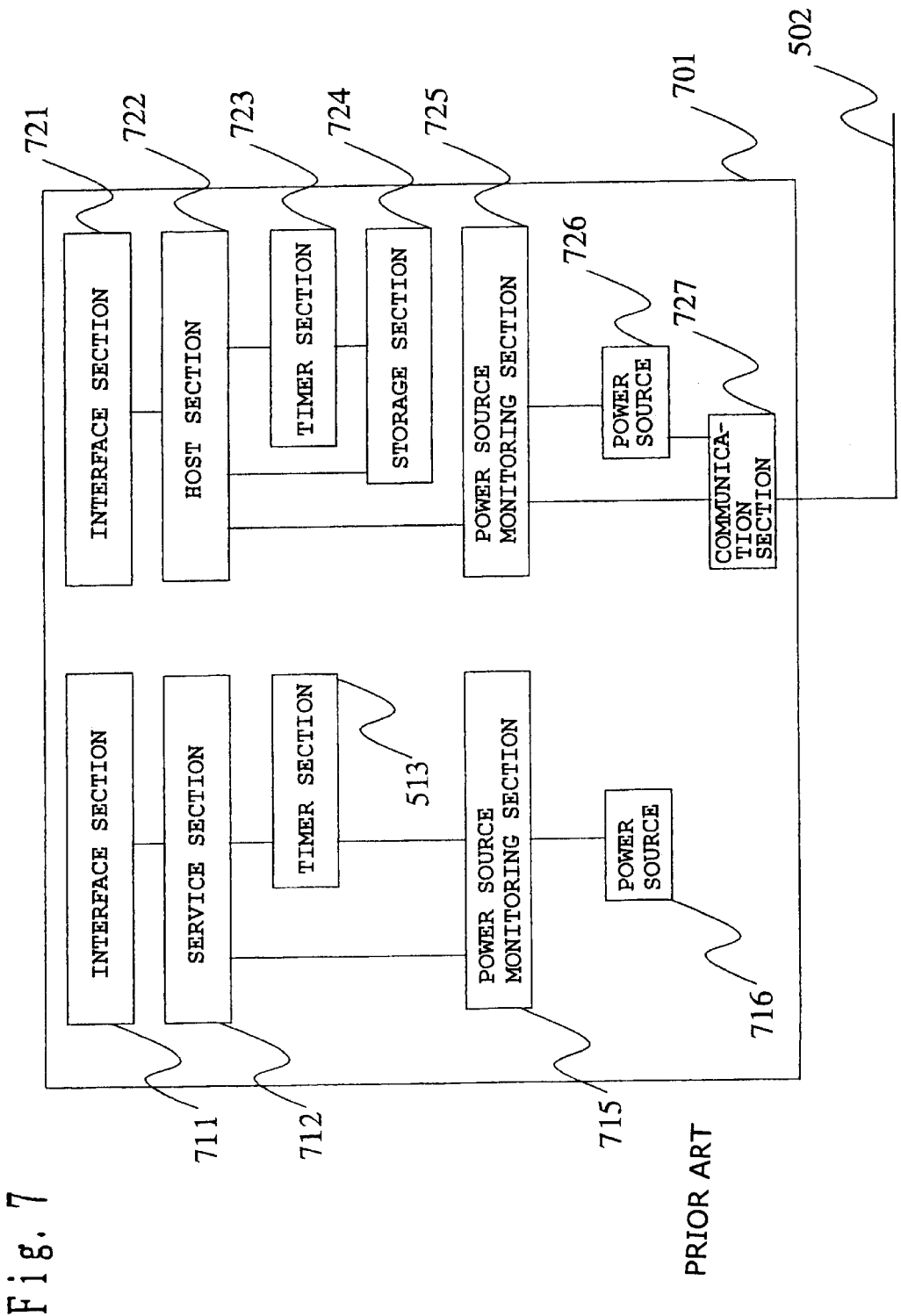
FIG. 7 is a diagram showing a configuration of a second example of the host apparatus according to the conventional art.
Figure 8:
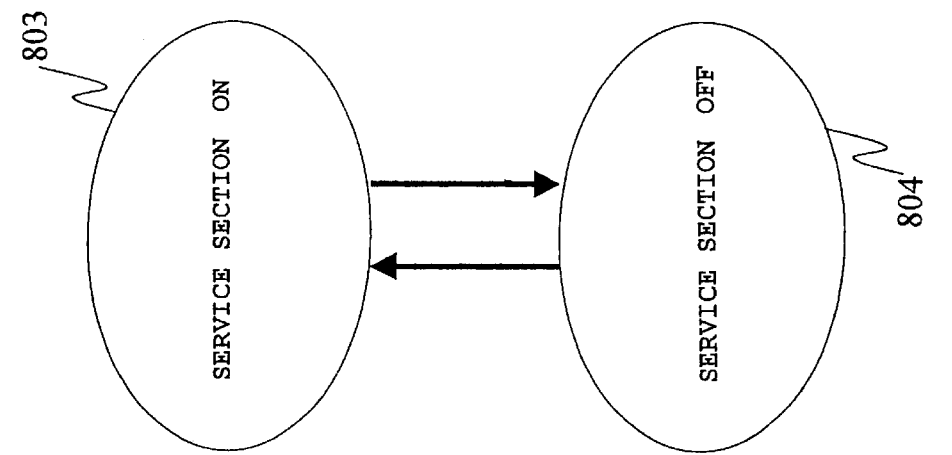
FIG. 8 is a diagram of a power control state transition of the second example of the host apparatus according to the conventional art.
Figure 8:
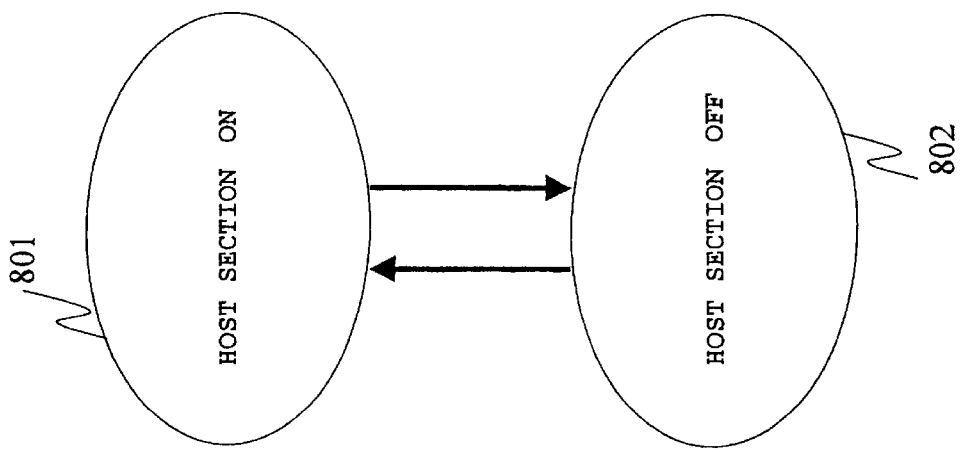

Next, FIG. 4 is a diagram of a power control state transition in operations of the second embodiment.

Operations of the host apparatus according to this embodiment will be described with reference to each mode and conditions of a state transition between each mode and a power saving switching method using the present invention will also be described using these two figures, FIGS. 3 and 4. However, parts overlapping with those in the first embodiment will be omitted, and different points will be described.

First, in the normal mode 201, the service section 104 and the host section 105 receive power supplies from the power source 110 via the power source monitoring section 106 in the host apparatus 301, and the power supplies to both of them are in the on state and they perform predetermined operations, respectively, as in the first embodiment.

Next, when a user issues a command to turn the host apparatus 301 into a standby state through the remote controller 303a in the interface section 303, the remote controller 303a sends a command to stop services to the service section 104, and the service section 104 having received it stops services. Moreover, the service section 104 sends a command to enter a wait mode to the power source monitoring section 106, and the power source monitoring section 106 reduces a power supply to a power sufficient for the service section 104 to start operations immediately and turns the power supply to the service section 104 into a standby state.

On the other hand, the interface section 303 sends a command to stop host operation receipt to the host section 105, and the host section 105 having received this command does not receive an operation reservation anew from a target apparatus connected to the network 102.

Moreover, the interface section 103 sends a command to check a working state to the host section 105, and the host section 105 having received it performs a transition of a mode according to each working state to be described below.

A state transition 411 is a transition in the case in which the host section 105 performs communication with the target apparatus connected to the network 102 and applies a control or monitoring operation to the target apparatus at the point when the host section 105 receives a check command from the interface section 303, and at this point, the host section 105 continues the control or monitoring operation as before.

Therefore, the power source monitoring section 106 turns the power source of the service section 104 into the standby state, while keeping the power supply to the host section 105 on. A state of each power supply to the service section 104 and the host section 105 at this point is called a service standby mode 401.

A state transition 413 is a transition in the case in which the host section 105 neither performs communication with a target apparatus connected to the network 102 nor applies a control or monitoring operations to the target apparatus at the point when the host section 105 receives a check command from the interface section 303, but a schedule of future control or monitoring operations has already been stored in the storage section 108 as reservation information, and in the case, the host section 105 transmits to the power source monitoring section 106 to stop the control or monitoring operation of the target apparatus and suppress the power supply to turn it into the standby state until a time set in the reservation information stored in the storage section 108. The power source monitoring section 106 having received this instruction turns the power supply to the host section 105 into the standby state.

At this point, the power source monitoring section 106 keeps both the power supplies to the service section 104 and the host section 105 in the standby state. A mode in this case is called a double standby mode 402.

Next, controls in the service standby mode 401 will be described.

As described above, the service standby mode 401 is a mode in which at least the power supply to the host section 105 is in the on state and the power supply to the service section 104 is in the standby state. At this point, the host section 105 performs a transition of a mode according to working states to be described below.

A state transition 412 is a transition in the case in which a user has sent an instruction to turn the host apparatus 301 into the off state directly to the interface section 303 without using the remote controller 303a of the interface section 303. At this point, the host section 105 performs communication with a target apparatus connected to the network 102 and applies a control or monitoring operation to the target apparatus.

The interface section 303 sends a command to stop the power supplies to the service section 104 to the power source monitoring section 106, and the power source monitoring section 106 having received this command stops the power supply to the service section 104 and turns the power supply to the service section 104 into the off state. On the other hand, the host section 105 continues the control or monitoring operation as before. Therefore, the power supply has transitioned to a mode in which the power source monitoring section 106 turns the power supply to the service section 104 off while keeping the power supply to the host section 105 in the on state, that is, the host mode 202.

A state transition 416 is a transition at the time when a user issued a standby releasing command to release the standby state of the host apparatus 301 using the remote controller 303a of the interface section 303. At this point, the interface section 303 sends a command to start the power supply to the service section 104 to the power source monitoring section 106, and the power source monitoring section 106 having received this command starts the power supply to the service section 104 and turns the power supply to the service section 104 into the on state. Moreover, the interface section 103 sends a command to start service operations to the service section 104, and the service section 104 having received this command starts a predetermined service operation.

On the other hand, since the host section 105 has been operating hitherto and the power supply is in the on state, the power supply has returned to a mode in which both the power source of the service section 104 and the host section 105 are in the on state and performs predetermined operations, that is, the normal mode 201 at this stage.

A state transition 419 is a transition at the time when the host section 105 finishes the operation and a reservation of monitoring or control has not been stored in the storage section 108.

The interface section 303 sends a command to immediately reduce the power to a level sufficient to start an operation to the host section 105 of the power source monitoring section 106, and the power source monitoring section 106 having received this command reduces the power supply to the host section 105 and turns the power supply to the host section 105 into the standby state. Therefore, the power supply has transitioned to a mode in which the power source monitoring section 106 keeps both the power supply to the service section 104 and the host section 105 in the standby state, that is, the double standby mode 402.

Next, controls in the double standby mode 402 will be described.

As describe above, the double standby mode 402 is a mode in the standby state in which at least the power source monitoring section 106 receives the power supply from the power source 110 and both the power sources of the service section 104 and the host section 105 are reduced to a power sufficient to start an operation. The host section 105 at this point performs a transition of a mode according to a working state to be described below.

A state transition 414 is a transition at the time when a user has issued a command to turn the host apparatus 301 into the off state through the interface section 303. At this point, the interface section 303 transmits a command to stop the power supply to the service section 104 to the power source monitoring section 106. The power source monitoring section 106 having received this command stops the power supply to the service section 104 and turns the power supply to the service section 104 into the off state. On the other hand, the interface section 303 sends a command to check a working state to the host section 105, and the host section 105 having received it performs a transition of a mode according to each working state to e described below.

If the host section 105 neither performs communication with a target apparatus connected to the network 102 nor applies a control or monitoring operation to the target apparatus at the point when the host section 105 receives a check command from the interface section 303, but schedules of control or monitoring operations in the future have already been stored in the storage section 108 as reservation information, the standby information is retained while the power source of the host section 105 being kept as before.

Therefore, at the stage in which the above operations have been performed, the power supply has transitioned to a mode in which the power source of the service section 104 keeps the off state and the power source of the host section 105 keeps the standby state, that is, the host standby mode 203.

A state transition 418 is a transition in the case in which reservation information is not stored in the storage section 108, and the power supply transitions to the down mode 204 in which an input state to the host section 105 is in the off state and both the power supplies to the service section 104 and the host section 105 are turned into the off state.

A state transition 415 is a transition to of the following working states. That is, the timer section 107 transmits a command to start a complete power supply to the host section 105 to the power source monitoring section 106 when a time set in reservation information stored in the storage section 108 has come. The power source monitoring section 106 having received this command resumes the complete power supply to the host section 105 and turns the power supply to the host section 105 into the on state.

Moreover, the timer section 107 sends a command to resume the control or monitoring operations to the host section 105, and the host section having received this command executes the control and monitoring operation of contents set in the reservation information stored in the storage section 108.

At this stage, since the power supply to the service section 104 is kept in the standby state and the power supply to the host section 105 is in the on state, the power supplies has transitioned to the service standby mode 401.

A state transition 417 is a transition at the time when a user sends a standby releasing command to the host apparatus 301 through the remote controller 303a of the interface section 303. At this point, the interface section 303 sends a command to start the power supplies to the service section 104 and the host section 105 to the power source monitoring section 106, and the power source monitoring section 106 having received this command starts the power supplies to the service section 104 and the host section 105 and turns the power supplies to the service section 104 and the host section 105 into the on state. Moreover, the interface section 303 sends a command to start service operations to the service section 104, and the service section 104 having received this command starts a predetermined service operation. In addition, the interface section 303 sends a command to resume the host operation to the host section 105, and the host section 105 having received this command receives an operation reservation from a target apparatus connected to the network 102.

At this stage, the power supplies to both the service section 104 and the host section 105 are in the on state, and the power supplies has returned to a mode in which the service section 104 and the host section 105 perform predetermined operations, that is normal mode 201.

In this way, according to this embodiment, an interface section is caused to receive a command of a standby state, whereby a service section can be turned into the standby state in addition to a host section by controls of the interface section and a power source monitoring section. Thus, power consumption can be reduced in operating a host apparatus and a flexible operation of the host apparatus becomes possible.

Further, the reserving operation setting means of the present invention has been described as the timer section and the storage section of the embodiment, but it is not limited to this and may be realized in any other configurations as long as it manages information of a target apparatus and host means to cause the host means to perform a reservation operation.

Figure 9:
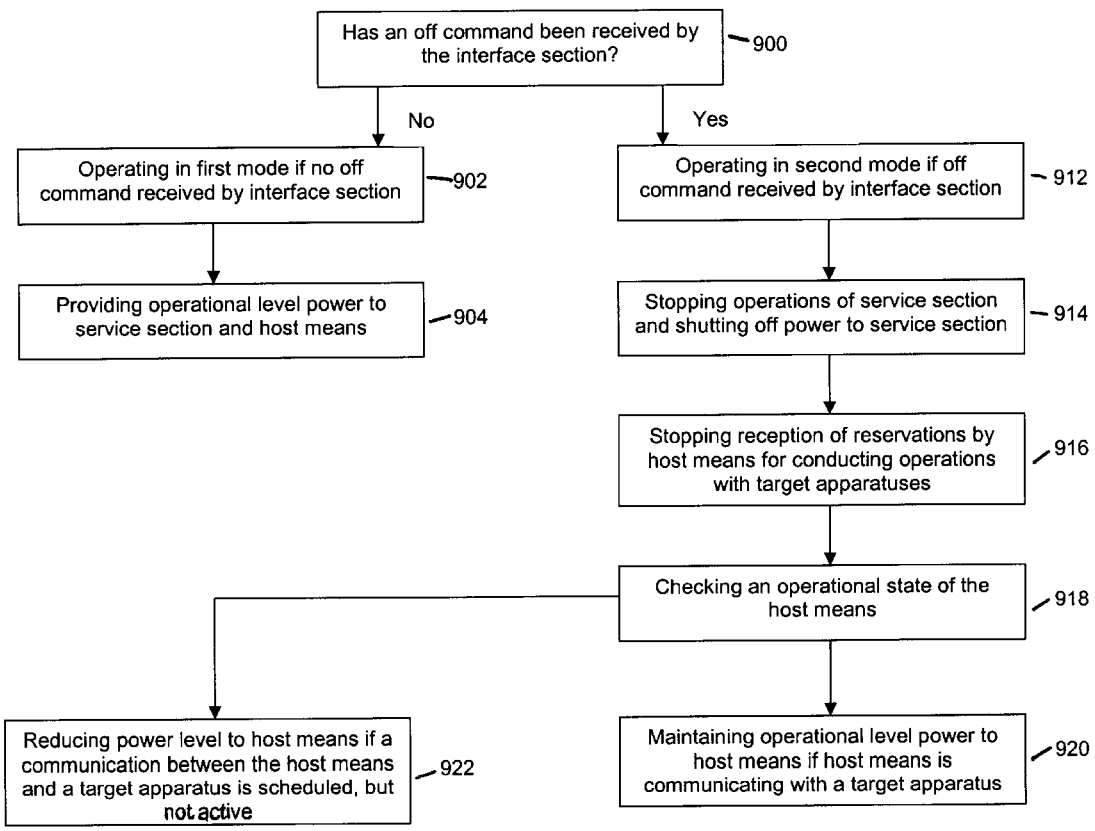
FIG. 9 is a flow diagram illustrating a method of operating a management apparatus in accordance with an exemplary embodiment of the present invention.

FIG. 9 is a flow diagram illustrating a method of operating a management apparatus including an interface section for receiving an input of at least an on command or an off command from a network, a host section for providing connection between the management apparatus and the network, and a service section for performing at least one predetermined operation of the management apparatus. At step 900, a determination is made as to whether an off command has been received by the interface section (See also the description of normal mode 201 with respect to FIG. 2). At step 902, operation is conducted in a first mode if no off command has been received by the interface section, where the first mode includes providing operational level power to the service section and the host section at step 904 (See also the description of normal mode 201 with respect to FIG. 2). At step 912, operation is conducted in a second mode if an off command has been received by the interface section, where the second mode including stopping operations of the service section and shutting off power to the service section at step 914, stopping reception of reservations by the host section for conducting operations with target apparatuses at step 916, and checking an operational state of the host section at step 918 (See also the description of normal mode 201 and state transition 211 with respect to FIG. 2). At step 920 operational level power to the host section is maintained if the checking step of the second mode indicates that the host section is communicating with a target apparatus (See also the description of state transition 211 with respect to FIG. 2). At step 922, a power level to the host section is reduced if the checking step of the second mode indicates that a communication between the host section and a target apparatus is scheduled, but not active (See also the description of state transition 213 with respect to FIG. 2).

In addition, in the above-mentioned embodiments, although operations of a host section have been described to be performed as communication, control and monitoring operations with the other target apparatuses connected to a network, the host means of the present invention is not limited to this and may be any means as long as it is connected to an external network to perform operations, for example, may be caused to receive an external control input.

In addition, in the above-mentioned embodiments, although any of the host apparatuses has been described as having the timer section 107 and the storage section 108, the present invention may have a configuration without reserving operation setting means, examples of which are timer section 107 and the storage section 108, in which case, operations without the host standby mode 203 and a state transition are performed in the above-mentioned embodiments.

Further, although the host apparatus as embodiments of a management apparatus of the present invention has been described in the above-mentioned descriptions, the present invention may be realized as a medium carrying a program and/or data for causing a computer to execute all or a part of functions of all or a part of means of the above-mentioned present invention, and a medium that is computer readable and the above-mentioned program and/or data read from which execute the above-mentioned functions in cooperation with the above-mentioned computer.

In addition, the present invention may be realized as an information aggregate that is characterized by being a program and/or data for causing a computer to execute a part of functions or a part of means of the above-mentioned present invention and executing the above-mentioned functions in cooperation with the above-mentioned computer.

In addition, in the above-mentioned description, the data includes a data structure, a data format, a type of data or the like. In addition, the medium includes a recording medium such as a ROM, a transfer medium such as the Internet, or a transfer medium such as light, electric wave, sonic wave or the like. In addition, the carries medium includes, for example, a recording medium recording a program and/or data recorded thereon and a transfer medium for transferring a program and/or data.

Moreover, processable by a computer means readable by a computer, for example, in the case of a recording medium such as a ROM and includes that a program and/or data to be an object of transfer can be handled by a computer as a result of transfer in the case of a transfer medium, and the information aggregate includes software such as a program and/or data.

Therefore, as described above, the configuration of the present invention may be realized as software or may be realized as hardware.

INDUSTRIAL APPLICABILITY

As described above, according to the present invention, a host function for a network control and a service function independent from the network control are individually applied a power control in operation of an apparatus operating on a network, whereby useless consumed power of the entire apparatus can be significantly reduced.

What is claimed is:

1. A management apparatus, comprising:

an interface section for receiving an input of at least an on command or an off command from the outside;

host means of providing connection between the management apparatus and a network;

a service section for performing at least one predetermined operation;

a power source for supplying power at least to said host means and said service section; and power supply controlling means of controlling the power source to control a state of a power supply to said host means and said service section, wherein said management apparatus is configured to operate in a first mode in the absence of the off command such that said power source provides the power supply to said service section and said host means at an operational level, said management apparatus being configured to operate in a second mode upon receiving the off command such that said interface section sends a command to the service section to stop performing the at least one predetermined operation and said power supply controlling means turns power to the service section off, said interface section being configured to send a command to said host means to stop receiving reservations for conducting operations with target apparatuses connected to the network in said second mode, and the interface section checks an operational state of the host means in said second mode, wherein if said checked operational state corresponds to said host means communicating with a target apparatus connected to the network, a power supply to the host means is maintained at an operational level such that communications between said host means and said target apparatus continue, and wherein if said checked operational state corresponds to a storage section of the management apparatus including a schedule of future communications to be conducted between the host means and a target apparatus connected to the network, but not an active communication between the host means and the target apparatus, the power supply to the host means is reduced by the power supply controlling means to a level between said operational level and an unenergized level.

2. The management apparatus according to claim 1, further comprising reserving operation setting means of reserving an operation of said host means, characterized in that if said interface section receives an input of an off command, said interface section checks an operating state of said host means and a reservation state of said reserving operation setting means, if said host means does not operate and a reservation is made in said reserving operation setting means, said interface section causes said power supply controlling means to turn the power supply to said host means into a standby state, and if said host means does not operate and a reservation is not made in said reserving operation setting means, said interface section causes said power supply controlling means to turn the power supply to said host means into an off state.

3. The management apparatus according to claim 1, characterized in that if said interface section confirms that the operation of said host means ends, said interface section causes said power supply controlling means to turn the power supply to said host means into an off state.

4. The management apparatus according to claim 1, characterized in that said interface section is further capable of receiving an input of a standby command, if said interface section receives an input of the standby command when the power supply to the host means and the service section is in an on state, said interface section causes said power supply controlling means to turn the power supply of said service section into a standby state and checks an operating state of said host means, if said host means operates, said interface section causes said power supply controlling means to turn the power supply to said host means into the on state, and if said host means does not operate, said interface section causes said power supply controlling means to turn the power supply to said service section and said host means into the standby state.

5. The management apparatus according to claim 4, characterized in that if said interface section confirms that an operation of said host means ends, said interface section causes said power supply controlling means to turn the power supply of said host means into the standby state.

6. The management apparatus according to claim 4, further comprising reserving operation setting means of reserving an operation of said host means, characterized in that if a reserved time set in said reserving operation setting means comes or if said interface section receives a command to release the standby command, said interface section causes said power supply controlling means to turn the power supply to said host means into the on state.

7. The management apparatus according to any one of claims 1 to 3, characterized in that if said interface section receives an input of an on command, said interface section causes said power controlling means to turn power supply to said service section and said host means into an on state.

8. A medium carrying a program and/or data for causing a computer to execute a part of functions or a part of means of the present invention described in any one of claims 1 to 5, characterized in that the medium is processable by a computer.

9. An information aggregate, characterized by being data for causing a computer to execute a part of functions or a part of means of the present invention described in any one of claims 1 to 5.

10. An information aggregate, characterized by being a program for causing a computer to execute a part of functions or a part of means of the present invention described in any one of claims 1 to 6.

11. A method of operating a management apparatus including an interface section for receiving an input of at least an on command or an off command from a network, a host section for providing connection between the management apparatus and the network, and a service section for performing at least one predetermined operation of the management apparatus, said method comprising the steps of:

determining whether an off command has been received by the interface section;

operating in a first mode if no off command has been received by the interface section, the first mode including providing operational level power to the service section and the host section;

operating in a second mode if an off command has been received by the interface section, the second mode including stopping operations of the service section and shutting off power to the service section, stopping reception of reservations by the host section for conducting operations with target apparatuses, and checking an operational;

maintaining operational level power to the host section if said checking step of the second mode indicates that the host section is communicating with a target apparatus; and reducing a power level to the host section if said checking step of the second mode indicates that a communication between the host section and a target apparatus is scheduled, but not active.

* * * * *